3,278,837
ION-GAUGE OUT-GASSING AND PRESSURE-MEASURING SWITCHING CIRCUIT

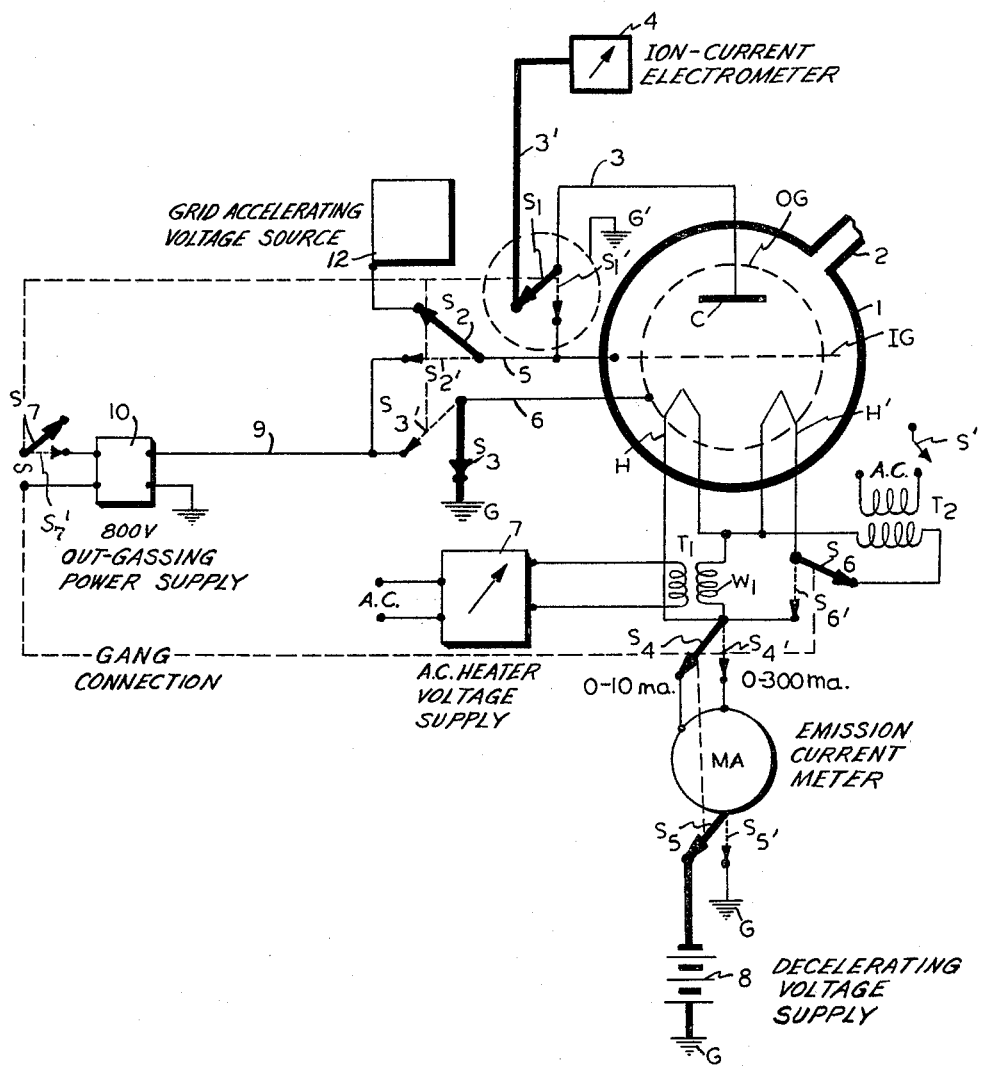

George Frederick Vanderschmidt, Boston, Mass., assignor to Lion Research Corporation, Cambridge, Mass., a corporation of Massachusetts
Filed June 27, 1962, Ser. No. 205,742
11 Claims. (Cl. 324—33)

The present invention relates to ion gauge pressure-measuring instruments.

Ion gauges must periodically be connected with radically different types of circuits; to wit, a highly sensitive ion-current detecting circuit and a high-voltage out-gassing circuit. Because of the radically inconsistent features and requirements of the sensitive ion-current indicating circuit and the high-voltage out-gassing circuit, it has not heretofore seemed possible to overcome the necessity for substantially separate circuits and connections for these different functions. This, of course, adds cost and complexity to the apparatus.

In accordance with the present invention, a novel switching circuit has been evolved that makes it possible to utilize common circuits and switching components for enabling the ion gauge to be alternated between the sensitive ion-current indicating circuit and the high-voltage out-gassing circuit without deleterious or interfering effects, and despite the irreconcilable differences in these two types of circuits.

A further object of the invention is to provide a new and improved ion-gauge circuit.

Other and further objects will later be described in the specificatoin and claims, the invention being described in connection with the accompanying drawing, the single figure of which is a circuit diagram of a preferred embodiment of the invention.

Referring to the drawing, a typical ion-gauge envelope is shown at 1 provided therein with an electron-beam generating heater H, an inner grid IG, a cylindrical outer grid OG, and an ion-collecting electrode C. A supplementary filament or heater H' for enabling gas-adsorption by flashing of the same, is also provided. Connection of the envelope 1 to a vacuum system, or other system the pressure of which is to monitored, may be effected through an outlet 2.

In the ion-current detecting mode of operation, connection is made from the collector electrode C by way of conductor 3 and a first switch element $S_1$, to a further conductor 3' that, in turn, connects with a sensitive electrometer or other ion-current indicating instrument 4. A suitable indicator 4 is described, for example, in an article by G. F. Vanderschmidt in "The Review of Scientific Instruments," vol. 31, No. 9, pages 1004–1005, September 1960. Small currents between about $1 \times 10^{-13}$ and about $1 \times 10^{-4}$ amperes are measured in this sensitive circuit. During such measurement, the inner grid IG is connected by conductor 5 and a further switch element $S_2$ to a source of accelerating voltage 12 (such as 150 volts positive); and the outer grid OG is connected by conductor 6 and a further switch element $S_3$ to the ground terminal G. The term "ground" as used herein is intended to connote not only actual earthing but chassis and other reference potential, as well.

The heater H is energized by a transformer $T_1$ connected either to an auto-transformer or to an automatic alternating-current heater voltage supply 7 which is regulated to insure constancy of the electron-emission current. The secondary winding $W_1$ of the transformer $T_1$ is connected by still a further switching element $S_4$ to a sensitive milliampere-current connection of an emission-current meter MA, labelled "0–10 ma.," meaning zero to ten milliamperes. The meter MA is connected by a further switching element $S_5$ to a grounded decelerating voltage source 8 that is preferably employed to prevent electrons from the heater H reaching the ion collector C during this sensitive ion-current measuring or detecting operation.

As before indicated, when it is desired to adsorb gas in the envelope 1, still an additional switch S will be closed, as by hand operation, energizing a further transformer $T_2$ from an A.C. source, so-labelled to flash the auxiliary heater H', as is well known.

In accordance with the present invention, it is possible to utilize many of the same circuit connections and switch elements to disconnect the ion gauge from this sensitive ion-current detecting circuit comprising elements 3, $S_1$, 3' and 4 and to connect the same to the high-voltage heavy duty out-gassing circuit, essential to maintain the gauge in proper order, and then to connect back to the sensitive ion-current detecting circuit again, without interfering effects such as accumulated charges, stray fields and the like. The heavy-line switch positions and heavy-line connections in the drawing indicate the ion-current detecting circuit, whereas the light-line switches, having prime notations, indicate the high-voltage out-gassing connections. It is to be understood, moreover, that all of the switches $S_1$ through $S_7$ (alternate positions of which are shown at $S_1'$–$S_7'$) are ganged to operate simultaneously.

Common conductor 3 and switch element $S_1$ may be connected to the inner grid conductor 5 by moving the switch $S_1$ to the switch position $S_1'$. Switch element $S_2$ that is also connected to conductor 5, is simultaneously moved to position $S_2'$ to connect, by way of conductor 9, to the high-voltage out-gassing power supply 10, such as an 800-volt direct-current power supply. The before-mentioned switch $S_3$ is moved to position $S_3'$ to connect the conductor 6, associated with the outer grid OG, to the same conductor 9. This last operation may be done simultaneously with, or after the connection of the inner grid IG to the high-voltage supply 10, depending upon the tolerable current drain from the supply 10; but is shown simultaneously effected.

The auto-transformer or automatic heater voltage supply 7 will then be increased in value, as indicated by the arrowed variable control, to provide a high voltage for producing a large number of electrons at the heater H in this out-gassing operation, and the switch $S_4$ will be moved to position $S_4'$ in order to connect the secondary winding $W_1$ of the transformer $T_1$ to a high-current meter position, labelled "0–300 ma." The switch $S_5$ will then be moved from the decelerating-voltage supply 8 to a ground terminal G, as shown at $S_5'$, in order to measure this very much greater emission current. In this last operation, still a further switch element $S_6$, associated with the auxiliary heater H', may be moved to position $S_6'$ connecting both heaters H and H' simultaneously in parallel with winding $W_1$.

With this novel common connection and switch arrangement, it has been found very critical that a particular section of the switching system be shielded from the alternating-current electric fields present in the remainder of the circuit in order to effect the sensitive ion-current measurements without disturbances from such alternating-current fields. Specifically, the switch element $S_1$, which may occupy positions $S_1$ and $S_1'$, is shielded, as indicated at G', to accomplish this end.

Still a further switch $S_7$, shown in the open position during the ion-detecting measurements, will be moved to the position $S_7'$ to energize the high-voltage out-gassing power supply 10 when out-gassing is to be effected.

The high-voltage supply 10 may also be a high-voltage alternating or pulsating source, in addition to the direct-current source before mentioned.

Further modifications will also occur to those skilled in the art and all such are considered to fall within the spirit and scope of the invention as defined in the appended claims.

What is claimed is:

1. An ion-gauge-operating circuit having, in combination, an ion gauge provided with collector, grid and heater electrodes and means for heating the latter; a high-voltage electrode-out-gassing power supply; an ion-current detecting circuit for connection with the said collector electrode; sources of grid-electrode accelerating voltage and heater decelerating voltage; and switching means provided with a plurality of synchronously operated switches adapted alternately to occupy at least two positions, one switch of the plurality of switches connecting the said ion-current detecting circuit to the collector electrode to receive ion current therefrom, a second switch of the plurality alternately connecting the said grid electrode to the said source of grid-electrode accelerating voltage and to the said high-voltage electrode-out-gassing power supply, and a third switch of the plurality alternately connecting the said heater electrode to the said heater decelerating voltage source and to ground.

2. An ion-gauge-operating circuit as claimed in claim 1 and in which shielding means is provided about the said one switch.

3. An ion-gauge-operating circuit as claimed in claim 1 and in which a second heater electrode is provided within the ion gauge, and the said plurality of synchronously operated switches includes a further switch adapted to connect the second heater electrode in parallel with the first-named heater electrode during the said connection of the third switch to ground.

4. An ion-gauge-operating circuit as claimed in claim 1 and in which means is provided for feeding a greater heater current to the heater electrode during the connection of the said second switch to the high-voltage electrode-out-gassing power supply.

5. An ion-gauge-operating circuit as claimed in claim 1 and in which a further switch is provided with means for operating the same synchronously with the said second switch and connected for de-energizing the high-voltage electrode-out-gassing power supply when the second switch is connected to the said source of grid-electrode accelerating voltage.

6. An ion-gauge-operating circuit as claimed in claim 1 and in which a second grid electrode is provided together with a further switch operable with means for connecting the same alternately to the high-voltage electrode-out-gassing power supply and ground.

7. An ion-gauge-operating circuit as claimed in claim 1 and in which a current meter is provided and the said third switch connects with means for connecting different scales of the current meter in circuit with the heater electrode for the said alternate connecting of the said third switch.

8. An ion-gauge-operating circuit as claimed in claim 1 and in which the said ion-current detecting circuit is provided with a sensitive electrometer connected therein.

9. An ion-gauge-operating circuit as claimed in claim 1 and in which a further heater electrode is provided within the ion gauge having means for energizing the further heater electrode.

10. An ion-gauge-operating circuit having, in combination, an ion gauge provided with collector, grid and heater electrodes and means for heating the latter; a high-voltage electrode-out-gassing power supply; an ion-current detecting circuit for connection with the said collector electrode; sources of grid-electrode accelerating voltage and heater decelerating voltage; and switching means provided with a plurality of synchronously operated switches adapted alternately to occupy at least two positions, one switch of the plurality of switches alternately connecting the said ion-current detecting circuit to the collector electrode to receive ion current therefrom and to the said high-voltage electrode-out-gassing power supply, a second switch of the plurality alternately connecting the said grid electrode to the said source of grid-electrode accelerating voltage and to the said high-voltage electrode-out-gassing power supply, and a third switch of the plurality alternately connecting the said heater electrode to the said heater decelerating voltage source and to ground.

11. An ion-gauge-operating circuit as claimed in claim 10 and in which shielding means is provided about the said one switch.

References Cited by the Examiner
UNITED STATES PATENTS

| | | | |
|---|---|---|---|
| 2,217,198 | 10/1940 | Davisson | 324—33 |
| 2,334,356 | 11/1943 | Salzberg et al. | 324—33 |
| 2,455,437 | 12/1948 | Nagel et al. | 324—33 |
| 2,758,233 | 8/1956 | Nelson. | |
| 2,801,387 | 7/1957 | Mitchell et al. | 324—33 |

OTHER REFERENCES

G. von Dardel et al.: Journal of Scientific Instruments (Q184.J7), vol. 30, No. 4, April 1953, pp. 114–117.

Hariharan et al.: Journal of Scientific Instruments (Q184.J7), vol. 33, December 1956, pp. 488–491.

Hoag et al.: Review of Scientific Instruments (Q184.R5), vol. 7, December 1936, pp. 497–499.

Nelson (B): Review of Scientific Instrument (Q184.R5), vol. 16, No. 3, March 1945, pp. 55–57.

Reynolds et al.: Review of Scientific Instruments (Q184.R5), vol. 25, No. 10, October 1954, pp. 1029–1031.

Ridenour: Review of Scientific Instruments (Q184.R5), vol. 12, March 1941, pp. 134–136.

WALTER L. CARLSON, *Primary Examiner.*

FREDERICK M. STRADER, *Examiner.*

C. F. ROBERTS, *Assistant Examiner.*